US008840789B2

(12) United States Patent
Creffield et al.

(10) Patent No.: US 8,840,789 B2
(45) Date of Patent: Sep. 23, 2014

(54) LOCAL SEWAGE PROCESSING UNIT, SEWAGE TREATMENT SYSTEM, METHOD OF LOCALLY PROCESSING SEWAGE AND SEWAGE TREATMENT PROCESS

(75) Inventors: Alan Creffield, Mount Eliza (AU); Andrew Moore, Blackburn (AU); Stephen Watt, Surrey Hills (AU)

(73) Assignee: Mono Pumps Limited, Manchester (GB)

( * ) Notice: Subject to any disclaimer, the term of this patent is extended or adjusted under 35 U.S.C. 154(b) by 315 days.

(21) Appl. No.: 12/707,645

(22) Filed: Feb. 17, 2010

(65) Prior Publication Data

US 2010/0243561 A1    Sep. 30, 2010

(30) Foreign Application Priority Data

Mar. 25, 2009  (GB) ................................. 0905139.2

(51) Int. Cl.
*C02F 3/30* (2006.01)
*C02F 9/00* (2006.01)
*C02F 3/20* (2006.01)
*C02F 1/44* (2006.01)

(52) U.S. Cl.
CPC . *C02F 9/00* (2013.01); *C02F 3/208* (2013.01); *C02F 2303/16* (2013.01); *C02F 3/30* (2013.01); *C02F 2307/08* (2013.01); *C02F 1/44* (2013.01); *Y10S 210/92* (2013.01)
USPC ........... 210/605; 210/614; 210/622; 210/259; 210/920

(58) Field of Classification Search
USPC ......... 210/605, 614, 620, 621, 622, 623, 630, 210/221.2, 252, 259, 920
See application file for complete search history.

(56) References Cited

U.S. PATENT DOCUMENTS

| | | | | |
|---|---|---|---|---|
| 3,875,051 A | * | 4/1975 | Kovarik | 210/605 |
| 4,059,521 A | * | 11/1977 | Lumsden | 210/195.3 |
| 5,106,493 A | * | 4/1992 | McIntosh | 210/100 |
| 5,527,464 A | * | 6/1996 | Bartha et al. | 210/603 |
| 5,647,986 A | * | 7/1997 | Nawathe et al. | 210/608 |
| 5,837,142 A | * | 11/1998 | Mullerheim et al. | 210/650 |
| 5,895,569 A | * | 4/1999 | Connelly | 210/170.08 |
| 6,284,138 B1 | * | 9/2001 | Mast | 210/606 |
| 6,322,701 B1 | * | 11/2001 | Delighiannis | 210/620 |
| 6,562,236 B2 | * | 5/2003 | Rylander et al. | 210/605 |
| 6,863,805 B1 | * | 3/2005 | Barreras et al. | 210/143 |
| 6,926,832 B2 | * | 8/2005 | Collins et al. | 210/615 |

(Continued)

FOREIGN PATENT DOCUMENTS

| | | |
|---|---|---|
| DE | 19823490 A1 | 12/1998 |
| GB | 2459754 A  * | 11/2009 |
| WO | WO 95/27682 A1 | 10/1995 |

OTHER PUBLICATIONS

UK Application No. GB0905139.2, Search Report Under Section 17, Date of Search Jul. 30, 2009, 1 page.

*Primary Examiner* — Fred Prince
(74) *Attorney, Agent, or Firm* — Blakely, Sokoloff, Taylor & Zafman LLP

(57) ABSTRACT

A local sewage processing unit is provided that receives sewage from a local source of sewage, extracts water from the received sewage that is suitable for re-use and includes a pump that is configured to pump sewage from a receiving section of the local sewage processing unit into a pressure sewer network, as required.

21 Claims, 2 Drawing Sheets

(56) References Cited

U.S. PATENT DOCUMENTS

| | | |
|---|---|---|
| 2003/0066804 A1 | 4/2003 | Tipton et al. |
| 2005/0205491 A1* | 9/2005 | Helm .......................... 210/617 |
| 2006/0054552 A1* | 3/2006 | Liu et al. ..................... 210/605 |
| 2006/0213831 A1* | 9/2006 | Dimitriou et al. ............ 210/620 |
| 2008/0116130 A1* | 5/2008 | Devine ......................... 210/605 |
| 2009/0223891 A1* | 9/2009 | Gauthier ...................... 210/605 |
| 2009/0250394 A1* | 10/2009 | Taylor .......................... 210/615 |
| 2010/0122945 A1* | 5/2010 | Williamson ................... 210/92 |

* cited by examiner

LOCAL SEWAGE PROCESSING UNIT, SEWAGE TREATMENT SYSTEM, METHOD OF LOCALLY PROCESSING SEWAGE AND SEWAGE TREATMENT PROCESS

FIELD

The present invention relates to a local sewage processing unit, a sewage treatment system, a method of locally processing sewage and a sewage treatment process.

BACKGROUND

At present, it is generally known to provide sewage systems in which sewage from a plurality of local sources, such as individual dwellings, are provided to a sewer network that transports the sewage to a central sewage treatment plant that processes the sewage for an entire area, for example, for an entire town. For remote areas, it is also known to provide small-scale sewage treatments units that may independently process the sewage from a local source, for example from an isolated dwelling.

However, both such presently known arrangements have significant drawbacks. Providing a sewer network and a sewage treatment plant that is capable of processing all of the sewage generated in a particular area requires a large investment of resources, both in terms of the infrastructure required to convey the sewage to the treatment unit, the scale of the treatment plant to process such a large amount of sewage and all the associated running costs. Providing individual sewage treatment units for each dwelling to individually process all of the sewage from each dwelling is also undesirable, in particular because of the costs associated with ensuring that the units are sufficiently robust and maintained that continuous treatment of sewage can be ensured and of ensuring that the sewage treatment unit is capable of dealing with all likely scenarios of sewage treatment requirements, including, for example, infrequent high inflows of sewage.

Accordingly, it would be desirable to provide improved systems for dealing with sewage.

SUMMARY

According to the present invention there is provided a local sewage processing unit including:
a receiving section configured to receive sewage from a local source of sewage;
a processing section, configured to extract water from the sewage received at the receiving section such that the extracted water is suitable for re-use; and
a pump, configured to pump sewage from the receiving section into a sewer network.

The present invention further provides a sewage treatment system, including:
a plurality of the local sewage processing units of the invention, each configured to process sewage received from a respective local source of sewage and extract water suitable for re-use;
a sewer network; and
a central sewage treatment plant;
wherein each of the local sewage processing units are configured to pump sewage from their respective receiving section into the sewer network; and
the central sewage treatment plant is configured to treat the sewage that is pumped into the sewer network.

Furthermore, according to the present invention there is provided a method of locally processing sewage, including;

receiving sewage from a local source of sewage and retaining the sewage in a receiving section of a local sewage processing unit;
processing a portion of the sewage from the receiving section in order to extract water from the sewage that is suitable for re-use; and
pumping a portion of the sewage from the receiving section into a sewer network.

The present invention further provides a sewage treatment process in which:
a plurality of local sources of sewage are separately processed according to the method of locally processing sewage of the invention in order to extract water from each of the local sources of sewage that is suitable for re-use;
sewage from the receiving section of each local sewage processing unit is pumped into a sewer network; and
sewage that is pumped into the sewer network from each of the local sources of sewage is processed at a central sewage treatment plant.

In an optional arrangement, the sewer network used in conjunction with the present invention may be a pressure sewer network.

The arrangements of the present invention may be particularly beneficial because the provision of local processing of a portion of the sewage from a local source of sewage reduces the amount of sewage that is transferred to the sewer network.

Accordingly, the required capacity of the sewer network is less than a conventional sewer network that requires the capability for handling all sewage that is produced. This reduces the cost and environmental footprint of the sewer network. Furthermore, the central sewage treatment plant, that processes the sewage from the sewer network also requires a smaller capacity, reducing the cost and the environmental footprint of the sewage treatment plant.

In addition, by extracting water for re-use at the local source of sewage, for example at each dwelling, the requirement for treated water is reduced. For example, the water required for use in garden watering, flushing toilets, washing cars, and so on, may be provided by the water extracted from the local source of sewage rather than using water that has been treated. This reduction in the requirement for treated water in turn reduces the required capacity of central water treatment plants and distribution systems for treated water. In turn this reduces the costs and reduces the environmental impact of these systems.

Accordingly, it is clear that the present invention may significantly reduce the total cost and environmental impact of both sewage disposal and treated water supply, both for individual users and suppliers.

Furthermore, because the local sewage processing units are not isolated and, in particular, are arranged to pump some sewage into the pressure sewer network, the local sewage processing units do not need to be able to cope on their own with every eventuality, as discussed further below, with the result that the design of the local sewage processing unit may be simplified and the cost of the units minimised.

The local sewage processing units may include a receiving section including, for example, a holding tank, in which initial anaerobic processing of the sewage takes place.

The local sewage processing unit may further include an aerobic processing chamber, in which air is injected into the sewage to promote aerobic processing of the sewage, resulting in a reduction of organic and inorganic contaminants.

The local sewage processing unit may then be configured to draw the sewage through a membrane, for example using a pump, in order to filter remaining contaminants, resulting in water that is suitable for re-use. This water may then be stored for use as required at the location of the local sewage processing unit, for example in a storage tank.

During filtering of the sewage through the membrane, contaminants may build up on the membrane. Accordingly, bubble aeration may be provided around the membrane in order to dislodge the contaminants, known as 'floc'. This floc is typically formed of organic precipitates, which generally settle to the bottom of the tank containing the membrane. A return pump may be provided to pump sewage back from this tank, including the floc, into the receiving section. This prevents an accumulation of floc within the tank containing the membrane and may, for example, stimulate anaerobic processing in the holding tank.

The local sewage processing unit may also comprise a controller which, in particular, may control the pump provided to discharge sewage to the pressure sewer network. However, it should be appreciated that the controller may also control at least one of the return pump that returns sewage from the tank containing the membrane to the receiving section, the pump that draws the sewage through the membrane and the blower, or blowers, provided to inject air into the aerobic processing chamber and provide air to the membrane for bubble aeration in order to dislodge contaminants.

The pump used to discharge sewage to the pressure sewer network may be any pump that is suitable for discharging sewage under pressure. In particular, a macerator pump may be used.

The controller may be configured to pump sewage from the receiving section of the local sewage processing unit into the pressure sewer network when one or more conditions are met.

For example, the controller may be configured to operate the pump to discharge sewage in the event of the inflow of sewage into the receiving section from the local source exceeding a predetermined flow rate. This may be beneficial because the treatment of the sewage in the local sewage processing unit may require particular retention times in individual sections in order to ensure correct anaerobic processing, correct aerobic processing and correct filtration through a membrane. Excessive inflows of sewage may reduce the retention times in the respective sections, reducing the quality of the water extracted from the sewage. Therefore, by configuring the local sewage processing unit to be able to divert excess inflows of sewage into the pressure sewer network, it can be ensured that the quality of the water extracted from the local source of sewage can be maintained, without requiring the local sewage processing unit to be able to cope with any conceivable follow rate of incoming sewage. Accordingly, the cost of the local sewage processing unit may be minimised.

Alternatively or additionally, the controller may be configured to operate the pump to discharge sewage from the receiving section into the pressure sewer network from the receiving section in the event that the overall level of sewage in the receiving section exceeds a predetermined level. Accordingly, such an arrangement may also be used to ensure that appropriate retention times for sewage in each section of the local sewage processing unit are maintained, ensuring the quality of the extracted water. However, a sensor for monitoring the level of sewage in the receiving section may be cheaper and/or more robust that a sensor for monitoring the flow rate of sewage being received.

Alternatively or additionally, the controller may be configured to operate the pump to discharge sewage from the receiving section to the pressure sewer network if the volume of residual sewage sludge in the receiving section exceeds a predetermined level. This arrangement may be particularly beneficial because, during sewage processing, there may be a build up of sludge that cannot be processed further. In the present invention, the return pump may ensure that the sludge build up is contained within the receiving section, from where it may easily be pumped into the pressure sewer network for treatment at a central processing plant. In contrast, in previously known isolated sewage treatment units, it has been necessary to monitor the level of residual sewage sludge and periodically have this pumped out to a sewage transporter for transfer to a further processing unit.

Accordingly, by arranging the local sewage processing unit of the present invention to pump sewage from the receiving section to the pressure sewer network, maintenance of the sewage processing unit is simplified and it is no longer necessary to monitor sludge levels or arrange for the sludge to be periodically pumped out to a sewage transporter for transfer to a processing plant.

It will be appreciated that the pump may be configured to, for example, extract sewage from the bottom of a holding tank within the receiving section such that the residual sewage sludge is preferentially pumped into the pressure sewer network. Accordingly, because as explained, the pump may be activated by the controller for one of more different reasons other than as a result of elevated residual sewage sludge levels, the level of the residual sewage sludge in the unit may be kept lower in any case. It will be appreciated, however, that the controller may, in any case, be configured to pump out completely the sewage in the receiving section periodically. The frequency of such a pumping out operation may be controlled by the controller.

Alternatively or additionally, the controller may be configured to operate the pump to discharge sewage from the receiving section to the pressure sewer network in the event of contaminants being detected that may prevent the correct operation of the local sewage processing unit. In particular, contaminants such as bleaches, washing soaps, oils and the like maybe a significant hindrance for sewage treatment. Accordingly, by pumping such contaminants into the pressure sewage network for treatment at, for example, a central sewage treatment plant, the design of the local sewage processing unit may be simplified. In order words, because the local sewage processing unit will not need to process such contaminants locally, its design may be simplified and/or its costs may be minimised.

In order to detect the presence of such contaminants, which may cause so-called "toxic shock", a sensor may be provided to detect the presence of the contaminants in one or both of the inflow of the sewage from the local source and within the receiving section itself, for example within a holding tank.

Alternatively or additionally, the controller may be configured to operate the pump to discharge sewage from the receiving section to the pressure sewer network in the event that the quality of the water extracted from the sewage in the processing section falls below a predetermined level. For example, a sensor may be provided to monitor the quality of the water extracted from the local source of sewage.

Accordingly, if, for any reason, the quality of the water extracted by the local sewage processing unit falls below a level that makes it suitable for re-use, sewage may be pumped directly into the pressure sewer network until the problem is resolved. For example, if the treatment of the sewage in the local sewage processing unit is hindered by contaminants, as discussed above, sewage may be pumped directly into the pressure sewer network until the contaminants are removed and correct processing of the sewage is resumed.

Alternatively or additionally, the controller may be configured to operate the pump to discharge sewage from the receiving section to the pressure sewer network in the event that it is determined that there is a possibility of a fault within the local sewage processing unit. For example, a sensor may be provided to monitor pressure changes within the system that may indicate a breakage in the membrane which would result in unfiltered sewage passing through. Likewise, a pressure sensor may indicate a high suction pressure, suggesting that the membrane may be clogged and therefore requires cleaning or servicing before the local sewage processing unit can continue normal operations.

Alternatively or additionally, the controller may be configured to operate the pump to discharge sewage from the receiving section to the pressure sewer network if a volume of unused extracted water exceeds a predetermined level. For example, the local sewage processing unit may include a storage tank for storing extracted water until it is required. Such a storage tank may include a sensor for monitoring the level of the water stored in the storage tank such that, if the tank becomes full, sewage may be pumped into the pressure sewer network rather than processed in the local sewage processing unit, preventing overfilling of the storage tank. This may be beneficial because it will be appreciated that the use of the extracted water may vary over time. As an example, it will be appreciated that more extracted water will be used during summer months for watering gardens than in winter months. Accordingly, the local sewage processing unit may be configured to adjust the balance between the sewage that is processed to extract water for re-use and the sewage that is pumped into the pressure sewer network, depending on the local requirements for the extracted water.

The local sewage processing unit may, in particular, be configured to process at least one of black water, namely sewage containing fecal matter, and grey water, namely waste water from the kitchen sinks drains, washing machines and other water derived from domestic cleaning processes.

The local sewage processing unit of the invention may be configured, by the provision of the appropriate processing of the sewage within the local sewage processing unit, to extract water that is Class A water, namely non-potable water of sufficient quality that it may be re-used without additional controls. Accordingly, the water extracted from the local source of sewage may be used locally for a variety of purposes. For example, if the local source of sewage is a dwelling, the extracted water may be re-used by the residents of the dwelling, for example for garden watering, car washing and flushing lavatories and other such purposes.

BRIEF DESCRIPTION OF THE DRAWINGS

The present invention will now be described by way of non-limiting examples, with reference to the accompanying drawings, in which.

DETAILED DESCRIPTION

Figure 1:
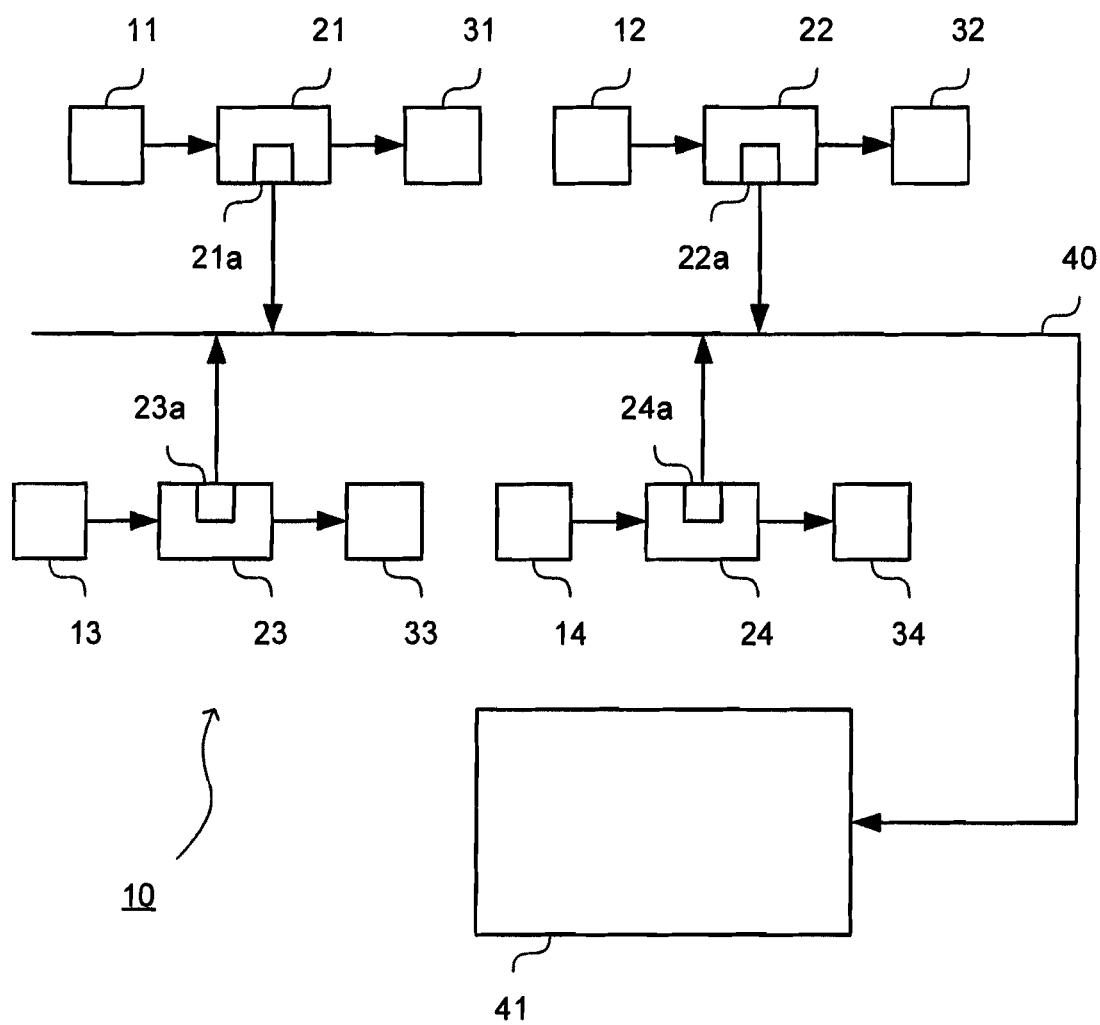
FIG. 1 depicts a sewage treatment system according to the present invention.

As depicted in FIG. 1, a sewage treatment system 10 according to the present invention may include a plurality of local sources of sewage 11,12,13,14. A local sewage processing unit 21,22,23,24 according to the present invention may be associated with each local source of sewage 11,12,13,14 and arranged to receive the sewage. Accordingly, for example, the local sources of sewage 11,12,13,14 may be individual dwellings, in which case the local sewage processing unit 21,22,23,24 may be buried in the ground adjacent to the dwelling.

It should also be appreciated, however, that the local source of sewage 11,12,13,14 may relate to a limited number of dwellings greater than one, for example to adjoining semi-detached houses or a group of flats. Likewise, the local sources of sewage, 11,12,13,14 need not be a dwelling but some or all may relate to, for example, an office or a light industrial unit.

Each of the local sewage processing units 21,22,23,24 is configured to process a portion of the sewage received from the local source of sewage 11,12,13,14 and extract water, for example, that is suitable for re-use. This may be stored in respective water holding tanks 31,32,33,34. For example, the extracted water may be used for flushing lavatories, watering gardens or washing cars or for similar purposes.

Each of the local sewage processing units 21,22,23,24 also includes a pump 21a,22a,23a,24a that is configured to pump a portion of the sewage from the local source of sewage 11,12,13,14 into a pressure sewer network 40. The pressure sewer network 40 is configured to receive sewage from each of the local sewage processing units 21,22,23,24 and provide the sewage to a central sewage treatment plant 41 that may, for example, treat all sewage received from a local area, for example from an entire town or village.

Although the arrangement depicted in FIG. 1 and described above relates to the use of the local sewage processing units 21,22,23,24 with a pressure sewer network 40, it should be appreciated that the local sewage processing units of the present invention may also be used with a conventional sewer network, namely one in which the sewage passed from the local sewage processing unit 21,22,23,24 flows to the central sewage treatment plant 21 under the action of gravity.

Figure 2:
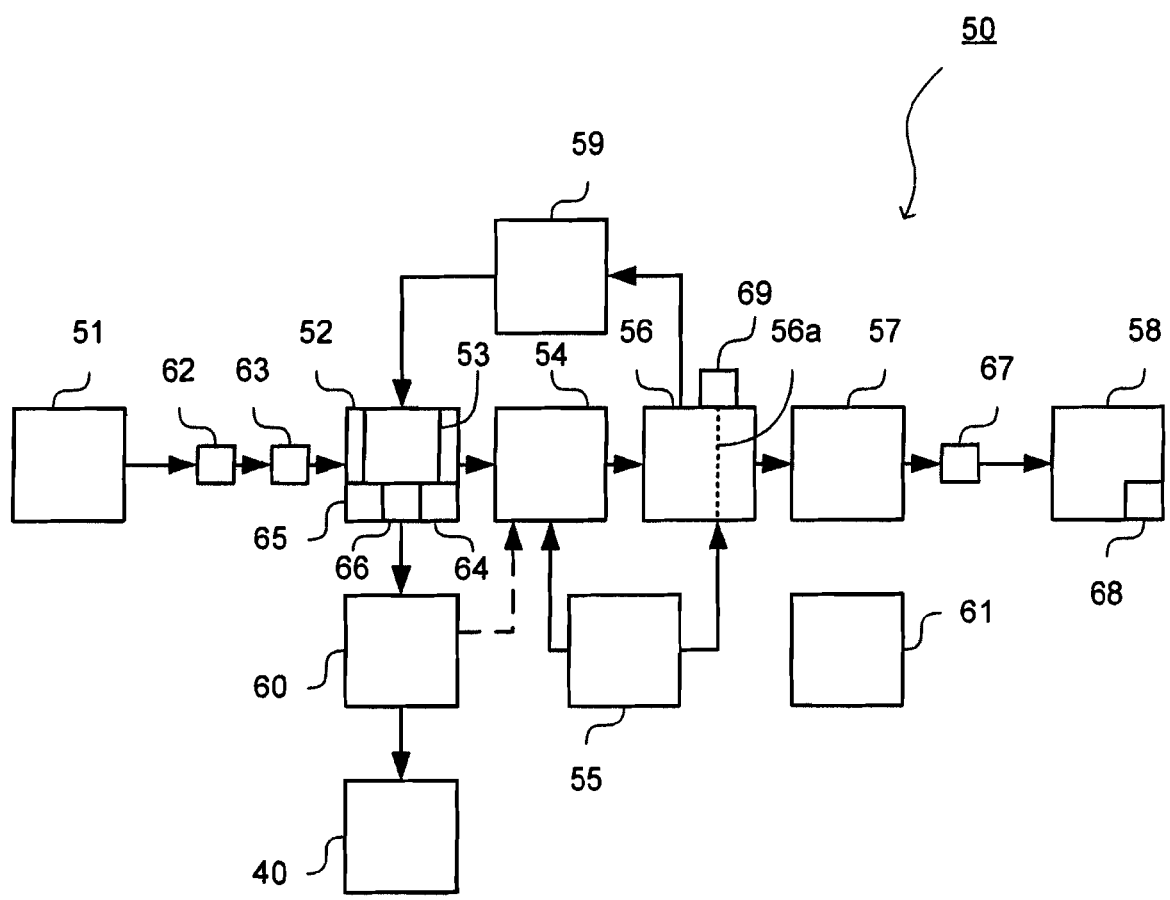
FIG. 2 depicts a local sewage processing unit according to the invention that may be used within such a sewage treatment system.

FIG. 2 depicts in more detail, a local sewage processing unit 50 according to the present invention that may be used within a sewage treatment system such as that depicted in FIG. 1.

As shown, sewage from a local source of sewage 51 is provided to a receiving section 52, that may include a holding tank 53. Sewage may be held in the holding tank 53 during which initial anaerobic processing of the sewage may take place.

The sewage may then be transferred to a processing section, including an aerobic processing chamber 54, in which air is injected into the sewage by, for example, a blower 55 to promote aerobic processing of the sewage.

Sewage from the aerobic processing chamber 54 may then be drawn into a membrane processing section 56 by a pump 57. The membrane processing section 56 includes a membrane 56a that is arranged to filter out contaminants from the sewage received into the membrane processing section 56. Accordingly, the pump 57 may extract from the membrane processing section 56 water that is suitable for re-use and, for example, pump it into a storage tank 58 that is provided to store the extracted water until it is required.

The membrane 56a in the membrane processing section may, for example, include a very fine microfiltration membrane bordering an ultra-filtration membrane formed in membrane strands. The membrane strand material may be polypropylene and may, for example, have a rectangular pour size of approximately 0.1 micron by 0.2 micron. The strands or bundles may then be combined together to form modules with a required number of strands. For example, a module with 5 strands may be used. Air may be provided to the membrane processing section from the blower 55 in order to provide bubble aeration around the membrane in order to prevent fouling. In other words, the bubble aeration dislodges contaminants that have adhered to the membrane and the resulting floc settles to the bottom of the membrane processing section 56.

As shown, the local sewage processing unit 50 may also include a return pump 59 that is configured to pump sewage from the membrane processing section 56 back into the receiving section 52. In particular, the return pump 59 may be configured such that it returns the floc that is dislodged from the membrane 56a into the receiving section 52, for example the holding tank 53, where it may stimulate the anaerobic process.

The local sewage processing unit 50 further includes a pump 60, for example a macerator pump, that is configured to discharge sewage from the receiving section 52 to a pressure sewer network 40. In particular, the pump 60 may be configured to extract residual sewage sludge from the holding tank 53 and pump it into the pressure sewer network 40.

The pump 60 may further be configured such that it may be used to transfer sewage from the holding tank 53 to the aerobic processing chamber 54. For example, the pump 60 may be configured such that it may either pump sewage from the holding tank 53 into the aerobic processing chamber 54 or may pump sewage from the holding tank 53 into the pressure sewer network 40. Accordingly, the sewage that is treated within the sewage treatment system may be macerated by a macerator pump without the requirement to provide an additional macerator pump beyond that which is used to pump sewage into the pressure sewer network 40.

A controller 61 may be provided to control the operation of the local sewage processing unit 50 according to the present invention. In particular, the controller 61 may control the operation of the pump 60 for pumping sewage into the pressure sewer network, the pump 57 for drawing sewage through the membrane 56a to extract water for re-use, the return pump 59 and the blower 55.

It should be appreciated, that although the description above refers to a single blower 55 for providing air to aerobic processing chamber 54 and the membrane processing section 56, separate blowers may be provided and each may be controlled by the controller 61. Alternatively, a single blower 55 may be provided and the controller 61 may be configured to independently control the flow rate of air provided to the aerobic processing chamber 54 and the membrane processing section 56.

The controller 61 may be configured to operate the pump 60 to discharge sewage from the receiving section 52 to the pressure sewer network 40 under particular conditions. It should be appreciated that the controller 61 may be configured to operate the pump 60 to discharge sewage into the pressure sewer network 40 in the event that any of a number of conditions occur or may be configured such that it only operates the pump 60 for a more limited number of conditions, for example for only a selected one of the possible conditions.

For example, the controller 61 may be configured to operate the pump 60 in the event of one or more of the inflow of sewage into the receiving section 52 exceeding a predetermined flow rate, the volume of sewage in the receiving section 52 exceeding the predetermined level, the volume of residual sewage sludge in the receiving section 52 exceeding a predetermined level, contaminants that would impede the correct processing of sewage in the local sewage processing unit being detected in the sewage in the receiving section 52 and/or the sewage entering the receiving section, the quality of water being extracted from the sewage falling below a predetermined level and the volume of extracted water being stored in the storage tank 58 exceeding a predetermined level. It will be appreciated that, in each case, the predetermined levels may be set appropriately to ensure that pumping of sewage into the pressure sewer network occurs when required.

In order to provide the requisite information to the controller 61 in order for it to operate the pump 60 to discharge sewage into the pressure sewer network 40, as desired, the local sewage processing unit 50 of the present invention may include at least one of a flow meter 62 for monitoring the flow rate of sewage being received at the receiving section 52, a sensor 63 for detecting contaminants in the sewage being received at the receiving section 52 that may adversely affect the processing of the sewage, a sensor 64 for detecting contaminants within the receiving section 52, for example the holding tank 53, that may adversely affect the processing of the sewage, a level sensor 65, configured to detect the level of sewage within the receiving section 52, for example within the holding tank 53, a sensor 66 for determining the level of residual sewage sludge within the receiving section 52, for example within the holding tank 53, a sensor 67 for detecting the quality of water extracted from the sewage, a sensor 68 for monitoring the level of extracted water within the storage tank 58 and a sensor 69 for indicating a fault or potential fault within the local sewage processing unit 50.

For example, a sensor 63,64 for detecting contaminants within the sewage that may adversely affect the processing of the sewage may include a pH sensor. However, such a sensor may not be able to detect contaminant oils that may affect the processing of the sewage. A sensor 67 for detecting the quality of water extracted from the sewage may, for example, be a turbidity sensor that monitors how clear the water is, providing an indication of the quality.

A sensor 69 for identifying faults or potential faults within the local sewage processing unit may be a pressure sensor, such as a vacuum transducer, that is configured to monitor the pressure of the sewage across the membrane 56a. For example, a low pressure may indicate a breakage in the membrane 56a, which would result in unfiltered sewage passing through to the storage tank 58. A high suction pressure may indicate that the membrane 56a is clogged. In that case, the membrane 56a may require cleaning or servicing. In either case, the controller 61 may be configured to provide an alarm, or some other form of indication to the user, in order to determine any corrective action that is required.

It will be appreciated that the sensors and detectors discussed above may only be provided if the controller 61 is to use the information from the sensor or detector to control the operation of the local sewage processing unit.

What is claimed is:

1. A local sewage processing unit comprising:
   a receiving section configured to receive sewage from a local source of sewage, wherein the receiving section includes a holding tank, configured to provide initial anaerobic processing of the sewage;
   a processing section, configured to extract water from the sewage received at the receiving section such that the extracted water is suitable for re-use; and
   a pump, configured to pump residual sewage from the receiving section into a sewer network that transports the residual sewage to a central sewage treatment plant.

2. The local sewage processing unit according to claim 1, wherein the processing section includes an aerobic processing chamber, configured such that air is injected into the sewage to promote aerobic processing of the sewage.

3. The local sewage processing unit according to claim 2, wherein the processing section further includes a membrane processing section, in which sewage from the aerobic processing chamber is drawn through a membrane in order to filter remaining contaminants, producing the water that is suitable for re-use.

4. The local sewage processing unit according to claim 3, wherein the membrane processing section is configured to provide bubble aeration around the membrane in order to dislodge contaminants adhered to the surface of the membrane.

5. The local sewage processing unit according to claim 4, wherein the processing section further includes a return pump, configured to pump sewage from the membrane processing section back to the receiving section and arranged such that the sewage returned to the receiving section includes contaminants dislodged from the membrane.

6. The local sewage processing unit according to claim 1, further comprising a controller, configured to control operation of the pump;
  wherein the controller is configured to operate the pump to discharge sewage from the receiving section to the sewer network in the event of at least one of:
  the inflow of sewage into the receiving section exceeds a predetermined flow rate;
  the volume of sewage in the receiving section exceeds a predetermined level;
  the volume of residual sewage sludge in the receiving section exceeds a predetermined level;
  contaminants that would impede the operation of the processing section are detected in at least one of the sewage in the receiving section and the sewage entering the receiving section;
  the quality of the water extracted from the sewage in the processing section falls below a predetermined level;
  it is determined that there is a fault in the operation of the local sewage processing unit; and
  a volume of unused extracted water exceeds a predetermined level.

7. The local sewage processing unit according to claim 1, wherein the processing section is configured such that the local sewage processing unit can process one or both of black and grey water.

8. The local sewage processing unit according to claim 1, wherein the processing section is configured such that the water extracted from the sewage is Class A water.

9. A sewage treatment system, comprising:
  a plurality of local sewage processing units, wherein each local sewage processing unit comprises:
  a receiving section configured to receive sewage from a local source of sewage, wherein the receiving section includes a holding tank, configured to provide initial anaerobic processing of the sewage;
  a processing section, configured to extract water from the sewage received at the receiving section such that the extracted water is suitable for re-use; and
  a pump, configured to pump residual sewage from the receiving section into a sewer network;
  wherein each local sewage processing unit is configured to process sewage received from a respective local source of sewage and extract water suitable for re-use;
  a sewer network; and
  a central sewage treatment plant;
  wherein each of the local sewage processing units is configured to pump sewage from the receiving section into the sewer network; and
  the central sewage treatment plant is configured to treat the sewage pumped into the sewer network.

10. The sewage treatment system according to claim 9, wherein the sewer network is a pressure sewer network.

11. A method of locally processing sewage, comprising:
  receiving sewage from a local source of sewage and retaining the sewage in a holding tank of a receiving section of a local sewage processing unit to provide initial anaerobic processing of the sewage;
  processing a portion of the sewage from the receiving section in order to extract water from the sewage that is suitable for re-use; and
  pumping a portion of the residual sewage from the receiving section into a sewer network that transports the residual sewage to a central sewage treatment plant.

12. The method of locally processing sewage according to claim 11, wherein initial anaerobic processing of the sewage takes place within a holding tank in the receiving section.

13. The method of locally processing sewage according to claim 11, wherein sewage from the receiving section is passed into an aerobic processing chamber and air is injected into the sewage in order to promote aerobic processing of the sewage.

14. The method of locally processing sewage according to claim 13, wherein sewage from the aerobic processing chamber is drawn through a membrane in order to filter remaining contaminants from the sewage, producing the water that is suitable for re-use.

15. The method of locally processing sewage according to claim 14, wherein bubble aeration is provided around the membrane in order to dislodge contaminants adhered to the surface of the membrane.

16. The method of locally processing sewage according to claim 15, wherein sewage that has not passed through the membrane is pumped back to the receiving section; and wherein the sewage returned to the receiving section includes contaminants dislodged from the membrane.

17. The method of locally processing sewage according to claim 11, wherein sewage is pumped from the receiving section into the sewer network in the event of at least one of:
  the inflow of sewage into the receiving section exceeding a predetermined flow-rate;
  the volume of sewage in the receiving section exceeding a predetermined level;
  the volume of residual sewage sludge in the receiving section exceeding a predetermined level;
  contaminants that would impede the processing of the sewage to extract water suitable for re-use being detected in at least one of the sewage in the receiving section and the sewage entering the receiving section;
  the quality of the water extracted from the sewage falling below a predetermined level;
  it is determined that there is a fault in the operation of the local sewage processing unit; and
  the volume of unused extracted water exceeding a predetermined level.

18. The method of locally processing sewage according to claim 11, wherein at least one of black and grey water is received at the receiving section.

19. The method of locally processing sewage according to claim 11, wherein the water extracted from the sewage is Class A water.

20. A sewage treatment process comprising:
  separately processing a plurality of local sources of sewage according to a method comprising:
  receiving sewage from a local source of sewage and retaining the sewage in a receiving section of a local sewage processing unit;

processing a portion of the sewage from the receiving section in order to extract water from the sewage that is suitable for re-use; and pumping a portion of the residual sewage from the receiving section into a sewer network;

wherein said separate processing is done in order to extract water from each of the local sources of sewage that is suitable for re-use;

pumping sewage from the receiving section of each local sewage processing unit into the sewer network; and processing at a central sewage treatment plant sewage that is pumped into the sewer network from each of the local sources of sewage.

21. The sewage treatment process according to claim 20, wherein the sewer network is a pressure sewer network.

* * * * *